Feb. 22, 1938.　　　M. BLY　　　2,109,189
ELECTRICAL TESTING AND DETECTING APPARATUS
Filed April 26, 1937　　　2 Sheets-Sheet 1
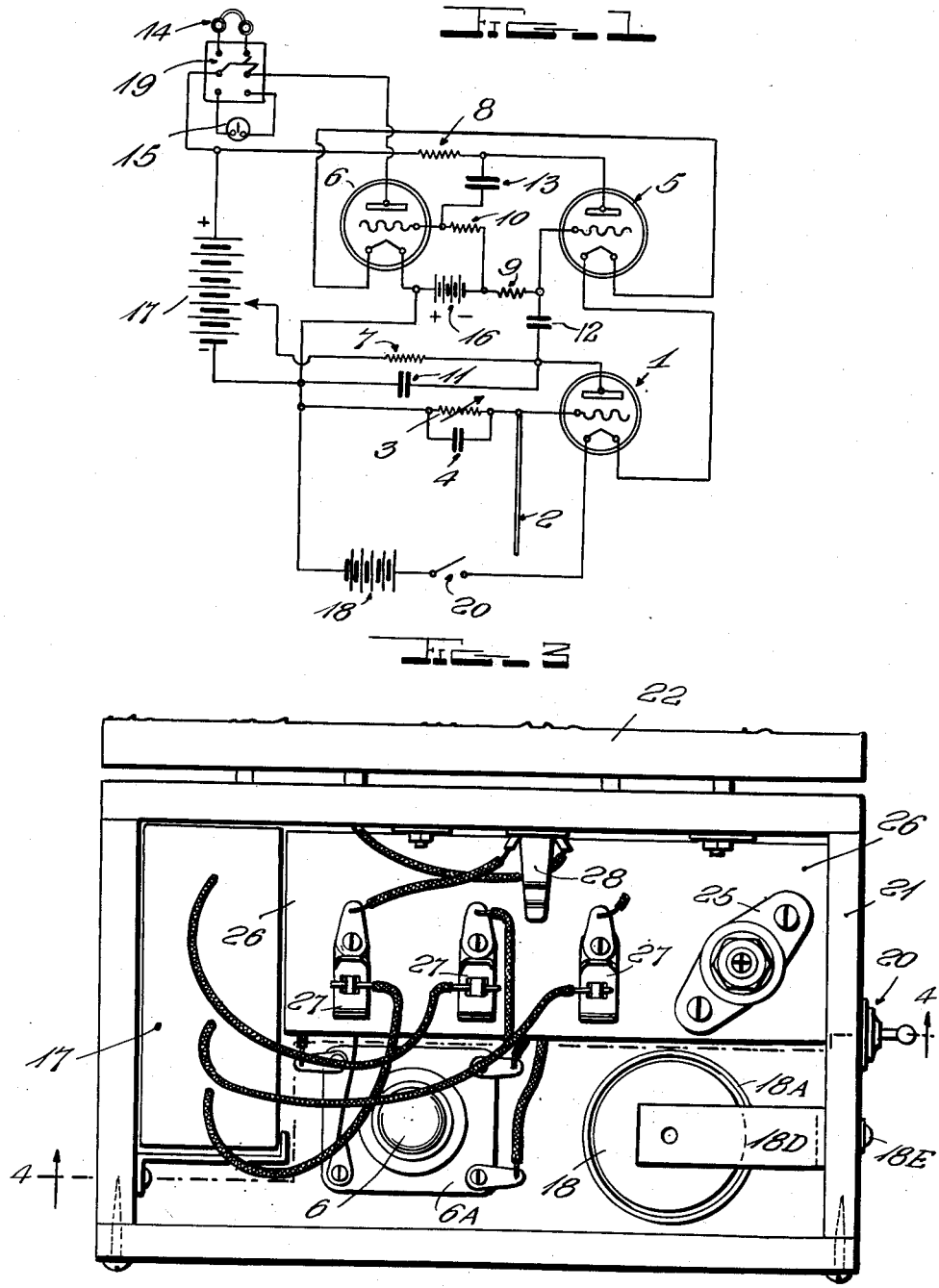
INVENTOR.
Merwyn Bly,
BY
ATTORNEY.

Feb. 22, 1938. M. BLY 2,109,189
ELECTRICAL TESTING AND DETECTING APPARATUS
Filed April 26, 1937 2 Sheets-Sheet 2
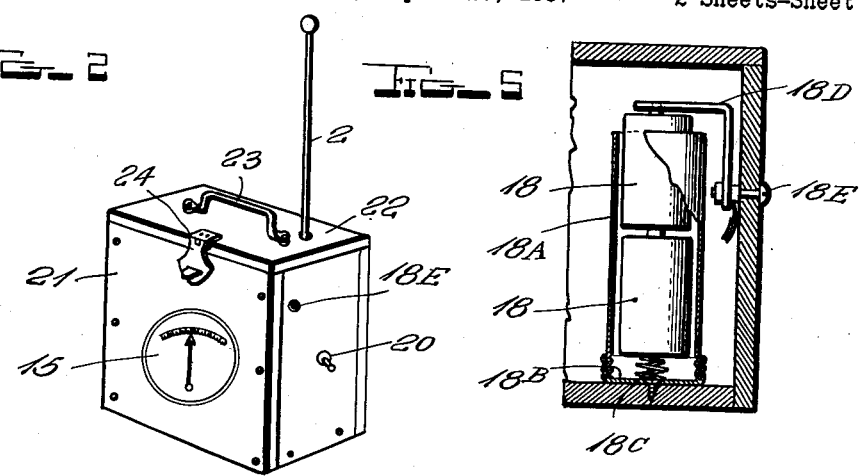
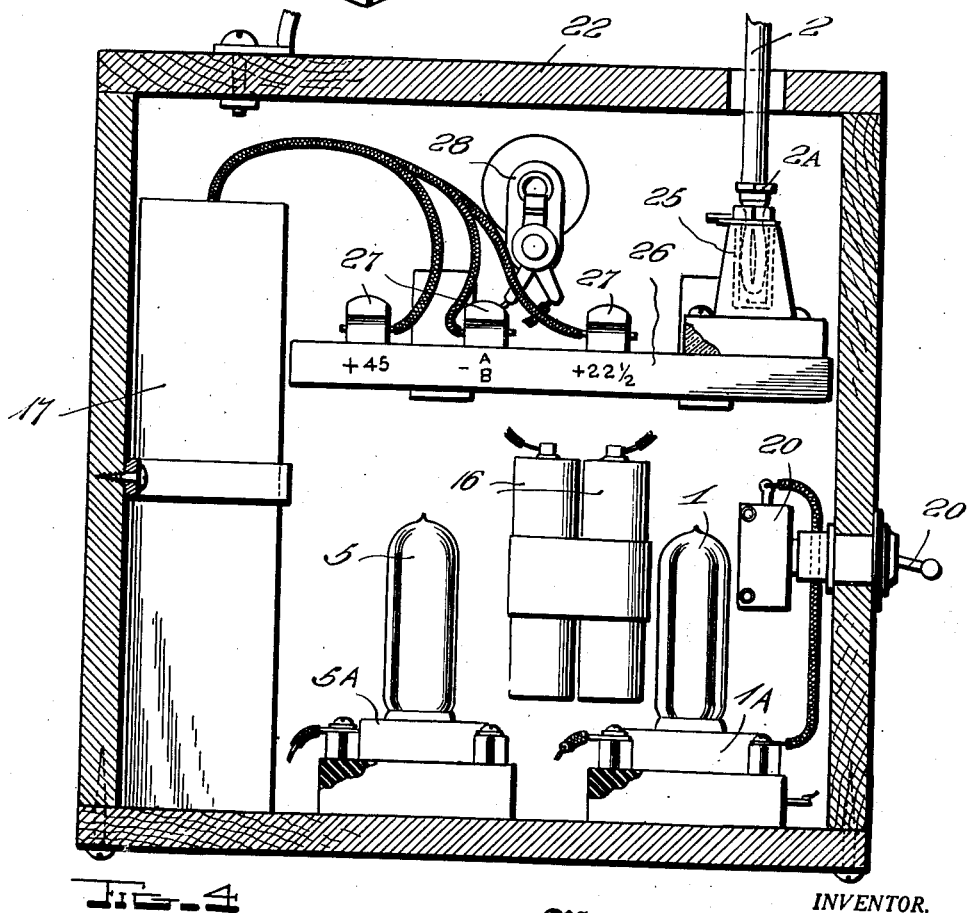
INVENTOR.
Merwyn Bly,
BY Ben J. Chrony
ATTORNEY.

Patented Feb. 22, 1938

2,109,189

UNITED STATES PATENT OFFICE 2,109,189

ELECTRICAL TESTING AND DETECTING APPARATUS

Merwyn Bly, Leesburg, Va.

Application April 26, 1937, Serial No. 139,040

8 Claims. (Cl. 175—183)

This invention relates in general to electrical testing instruments and more particularly to the detection of electromagnetic fields adjacent to current carrying wires and other conductors and also such objects as may be carrying current as a result of proximity to such wires and other conductors. This invention also finds ready application in checking electrical equipment.

My invention is designed to detect the existence, comparative strength, location, and general nature of electromagnetic fields adjacent to current carrying wires or other conductors, or objects affected by such fields, as will be explained.

While not limiting myself to those listed herewith, some of the practical uses of my invention include:

Determination of partial shorts, grounds, and other leaks and losses, as well as detecting various types of pick-ups and crosses on current carrying lines which may cause radio reception interference; determination of the general type of field surrounding lines, apparatus and the like, described above; and particularly determination of the location and direction of lie or run of such lines when walled up or buried.

For clarification, examples of determination of the type of field present would include: distinguishing between say 25 and 60 cycle a. c. lines which any reasonably skilled operator, employing my invention can easily do, by listening on the phones which are a part of this device. In the case of a buried line where one wire is grounded and one or more are not grounded, the not grounded side of the line, if in good order will produce a more or less clear hum in the phones; the grounded side however, will produce a hum with a definite buzzing component; since the sound is loudest with my invention when the antenna is held parallel and directly over the conductor, location of either side of the line is usually practicable even though they are separated by a very few inches. In cases where a high tension line picks up some component to cause radio interference it is often possible with my invention to actually identify the source of trouble through the fact the noise heard in the phones is a more or less faithful reproduction of the noise actually made by the interfering device. Devices now in use ordinarily produce a heterodyne howl or indicate the interference in the form of a rather meaningless high noise level without distinguishing characteristics.

As my invention detects audio frequencies somewhat higher and lower than those ordinarily audible to the human ear it is also useful in checking obscure hum and circuit noises in radio equipment. The apparatus of my invention will indicate rather closely the amplifier stage or particular part of the equipment in which the noise originates.

Devices now in use for checking trouble on current carrying lines are generally bulky, heavy, more or less critical of adjustment, considerably affected by outside interference, usually not susceptible to determination with any practical accuracy, the exact location of the trouble except after long trail and error, and ordinarily fail to analyze the nature of the fields or interference, nor do they lend themselves readily to use in locating walled up or buried lines, particularly in confined spaces.

My device, on the other hand, is sensitive, extremely portable, and does not require adjustment nor tuning. It is not affected by outside interference. It will locate with practical accuracy, that is, pick the exact pole, ground wire, guy cable and the like at the spot where the leak or loss is occurring. Furthermore it will give a comparative indication of the magnitude of the leak or loss, indicate its general nature, and locate its direction of lie or run. My invention lends itself readily to the location of walled up and buried conductors to within a few inches and definitely indicates their direction of lie or run.

The device of my invention operates by pickup on the grid antenna (and some pick up by the circuit wiring and tubes themselves) and not by physical connection of any sort to the circuits being investigated. It incorporates provision for slight feed back from grid to filament circuit in order that the accumulated charges may gradually leak off the grids and prevent blocking; thus differing from devices utilizing floating or open grids with no physical (grid leak and condenser) grid-to-filament return; such devices being subject to grid blocking on strong pick-up or signals, a condition that prevents the open or floating grid from functioning satisfactorily in investigating electromagnetic fields of such intensity as are often found in the practical use to which my invention is to be put.

Referring briefly to the drawings which form a part of this description, Fig. 1 is a schematic diagram of the circuit arrangement employed in my invention; Fig. 2 is a perspective view of an embodiment of my invention; Fig. 3 is a view looking into the top of the open cabinet of the embodiment of my invention shown in Fig. 2; Fig. 4 is a sectional view along the line 4—4 of Fig. 3; and Fig. 5 is a detail view of the cathode battery holder employed in an embodiment of my invention.

Referring to Fig. 1 of the drawings in detail, reference numeral 1 designates a detector tube 1, operated in a non-oscillating condition. The antenna 2, is a prolongation of the grid, and is preferably a small copper rod with provision for plugging in and removing as more clearly shown in Figs. 2, 3 and 4. The optimum length for this antenna has been calculated so as to impress the highest signal on the detector grid, yet maintain physical dimensions of the antenna short enough to fully retain the portable features of this instrument, which features are an important consideration in its practical applications. In practice the preferred length of the antenna rod itself, exclusive of circuit wiring, is several inches less than one foot, although this, of course, may vary with different types of tubes employed.

To attain high impedance in the grid circuit with resultant high pick-up sensitivity the grid leak 3, is of high value (approximately 20 megohms). The grid condenser 4, is of very low capacity (approximately .00001 mmfd.). The high pick-up coefficient secured through such approximate values of grid leak and grid condenser approaches that of an open, or "floating" grid; yet enough return from grid to filament has been provided to prevent blocking of the grid on strong signals (in the case of my invention the intense fields adjacent to high tension leaks and the like).

The coupling and general circuit design of the audio amplifier tubes 5 and 6 (and possible additional audio stages) may be of any convenient form or type, however, I have obtained the best results when using resistance coupling between stages in which plate resistors 7 and 8, of rather high value (approximately 3 megohms) were employed in order to maintain the overall high impedance of the detector and amplifier circuit. It is possible in my invention to use this high value of plate resistors without overheating or breakdown thereof because the total plate current drain from the "B" battery 17 is exceptionally low, the total plate current drain on a preferred model for detector and two stages of audio amplification combined being less than 2 milliamperes.

The grid resistors 9 and 10 are also of a rather high value being on the order of approximately 3 megohms for the reasons already covered above. The condensers 11, 12 and 13, are small fixed capacities and serve as by-pass and coupling condensers. For example the capacity 11 is connected between the plate of the detector tube 1 and the cathode battery 18; the condenser 12 is connected between the plate of the detector tube 1 and the grid of the amplifier tube 5 and the condenser 13 is connected between the plate of the tube 5 and the grid of the tube 6.

The receivers 14, which may be of the telephone type, bone conduction type or other suitable design are of a high impedance, preferably around 20,000 ohms. If desired a suitable meter 15, of 0-1 milliameter deflection may be employed as an indicating device and either the receivers 14 or the meter 15 may be connected in the plate circuit of the final amplifier 6 by means of the switch 19. The meter is employed to read change in plate current in tube 6 as a result of signals of different strength being picked up by the antenna 2. Where desired receivers 14 of the piezo electric crystal type may be used; furthermore the output of the amplifier 6 may be connected to deflect the beam of a cathode ray tube device of conventional design to obtain visual indications of the signals picked-up.

The grid bias supply 16, is furnished by midget batteries of bias cells, and is designed to be of as high a voltage as will permit efficient operation of the amplifier tubes and in order that the plate current drawn by the amplifier stages shall be a minimum to conserve the plate supply battery 17, which is of very small size in order to reduce the weight of the apparatus. The plate current of the detector stage is held to a minimum by the high value of the grid resistor 3.

In the preferred embodiment of my invention the tubes 1, 5 and 6 are of a midget variety, designed to use 0.25 ampere at 1.1 volts. To keep down the current drain on filament battery 18, which is usually a pair of flashlight cells, the filaments of the three tubes are connected in series and the filament battery is composed of two cells connected in series, making the filament system draw 0.25 ampere at 3.3 volts. It is, of course, obvious that tubes having a lower current drain at a slightly higher voltage may be employed and that the filaments of the several tubes may be connected in parallel or series-parallelled if desired.

While transformer coupling of the audio stages could be employed with perhaps a higher gain, resistance coupling is preferred in order to eliminate the bulk and weight of transformers.

The housing or container for the tubes and various components of this device is of non-metallic material as more fully described and shown in Figs. 2, 3 and 4. All arrangements are constituted to facilitate pick-up by circuit wiring, tubes and other parts used, as contrasted with the customary practice of shielding and similar arrangements to avoid such pick-up.

Fig. 2 of the drawings illustrates a perspective view of the exterior of the cabinet employed in an embodiment of this invention. The cabinet 21 is made of wood, phenol condensation products, fiber, hard rubber, glass or the like. A suitable hole is cut in the front of the cabinet to receive the milliampere meter 15 so that this meter may be read from the exterior of the cabinet in cases where the cabinet is made of opaque material. The filament circuit switch 20, is supported on the side of the cabinet so that the energization of the filaments of the tubes 1—5—6 may be controlled from the outside. The antenna 2 which is connected to the grid of the tube is supported on the shelf 26, positioned inside of the cabinet as shown in Figs. 3 and 4, by the insulation support 25 which is provided with a suitable contactor on the inside thereof to contact the plug portion 2A attached to the lower end of the antenna 2 so that the aforesaid antenna may be inserted or removed when necessary. The antenna extends into the cabinet through a hole bored through the top 22.

The cabinet is also provided with a handle 23 to facilitate carrying the device. A hinged lock 24 attached to the top of the cabinet and extending over the front thereof is employed to lock the top down upon the cabinet when the device is being carried or used.

The vacuum tubes 1—5—6 are supported in suitable sockets 1A—5A and 6A respectively, which are attached to the bottom of the cabinet on the inside thereof. In order to make the device as small as possible the detector tube 1 and the amplifier 5 are positioned below the shelf 26 which carries the antenna support and the connecting terminals 27 of B battery supply 17. The C battery 16 is attached to the back wall of the cabinet by a suitable strap 16A. The various condensers and resistors employed for connecting the vacuum tubes as shown in Fig. 1, are not illustrated in Fig. 4, however, they are supported along side of and between the vacuum tubes 1—5—6 in order to make the connections thereto as direct as possible to reduce the tendency of the connecting conductors to vibrate and obviate loosening of connections between the apparatus.

The filament battery 18 is supported inside of a cylindrical member 18A, the bottom 18B of which is attached to base of cabinet with a suitable screw. A spring 18C is positioned in the bottom of the cylindrical member 18A and contacts the bottom of the battery cell, making electric connection therewith such that the filament circuit of the vacuum tube may be completed through this spring 18C. The angle member 18D which is pivotally attached to the side wall of the cabinet by the means of a suitable bolt 18E, contacts the positive terminal 18F of the uppermost battery cell.

The battery cells 18 fit loosely in the cylindrical member 18A and may be easily removed therefrom when the angle member 18D is moved sidewise on its pivot 18E towards the insulation support 25 out of engagement with the positive terminal of the battery 18.

In operation the device of my invention may be employed either with the telephone receivers or headphone 14 or with the small meter 15 as indicators. If it is desired to use the telephone receivers the operator may do so by inserting the telephone receiver plug into the switch jack 28 which is connected to the output circuit of the tube 6.

Furthermore if it is desired, the antenna 2 may be made of several sections telescoped into each other so that the antenna may be collapsed into the cabinet and need not be made removable in plug-in fashion from the cabinet. The telescoped sections of the antenna would when extended out of the cabinet simulate a pick-up member which may be placed along conductor members the same as the antenna illustrated.

The operation of the device is relatively simple once the apparatus is assembled, connected and in operative condition. The device is then held by the operator with the antenna 2 parallel to the position which it is thought the wire or cables to be located occupy. If the operator hears a humming sound characteristic of an alternating current line or if he hears a buzzing sound produced by an interference transmitted over the wires or cables, then he is appraised of the fact that the wires or cables are close to the antenna 2 of the instrument. The instrument is then moved about slowly and carefully until the sound is of maximum intensity. The operator then knows that the antenna is to parallel to the wires in as close a position as possible thereto. This is in the case of buried or walled-in wires or cables.

Where it is desired to locate interference which is transmitted over open lines the device may be taken along the transmission system from pole to pole and if placed adjacent to the grounded wire positioned on the various poles of said system the exact pole at which the interference is taking place may be located in cases where the interferences is set up by leakage in pole transformers, insulation or the like.

While I have described this invention in detail with respect to a certain embodiment thereof it is understood that I do not desire to limit this invention to the exact details illustrated and described except in so far as those details may be defined in the claims.

I claim and desire to secure by Letters Patent:

1. A vacuum tube testing instrument for the detection of electro-magnetic fields adjacent to current carrying wires or other conductors, or objects which have become conductors as a result of proximity to said wires or conductors, comprising: a non-oscillating grid-leak detector including a high impedance grid-leak, an antenna consisting of a substantially straight member of predetermined dimensions connected direct to said grid, an amplifier having one or more stages of amplification connected to said detector, indicating device means connected to the output of said amplifier to indicate the comparative strength and nature of fields being investigated and for detection of said electro-magnetic fields, the impedance of said grid-leak being just low enough to prevent "blocking" of the grid of said detector under conditions where strong fields are being investigated.

2. A vacuum tube testing instrument for the detection of electro-magnetic fields adjacent to current carrying wires or other conductors or objects which have become conductors as a result of proximity to said wires or conductors, comprising: an extremely sensitive non-oscillating detector, said detector having anode, cathode and grid electrodes, a high impedance grid return circuit connected between said cathode and grid electrodes, an antenna consisting of a substantially straight conducting member connected direct to the grid electrode of said detector, said antenna being of predetermined dimensions such that wires, conductors or objects carrying current or receiving electrical charges as a result of close proximity to current conductors may be located by placing said antenna adjacent to and along side thereof, an amplifier connected to the anode of said detector and indicating means connected to said amplifier.

3. A portable vacuum tube testing instrument for the detection of electro-magnetic fields adjacent to current carrying wires or other conductors, or objects which have become conductors as result of proximity to said wires or conductors, comprising: a vacuum tube detector, a rod-like antenna of predetermined length connected direct to the grid of said detector, an amplifier connected to said detector, indicating means connected to said amplifier, current supply sources for energizing the anode and cathode circuits of said detector and said amplifier, a cabinet for housing said detector, said amplifier and said current supply sources, and an insulation support attached to said cabinet for supporting said antenna in a predetermined position extending away from said cabinet, said antenna and said insulation support having plug and jack means whereby said antenna may be removed from said support and disconnected from said detector when the instrument is not in use.

4. A portable vacuum tube testing instrument for the detection of electro-magnetic fields adjacent to current carrying wires or other conductors or objects which have become conductors as a result of proximity to said wires or conductors, comprising: a sensitive detector tube having cathode, anode and grid electrodes, a high impedance grid leak included in the circuit between said cathode and grid electrodes, a source of current supply connected to energize said cathode and said anode, said grid leak impedance being of such a high value as to reduce the anode current substantially to a negligible value when the grid electrode of said detector tube is not being energized by signal energy, an antenna connected direct to said detector tube grid electrode, said antenna being portable and of small physical dimensions such that its long dimension may be positioned in parallel inductive relation to conductors to be located to determine the direction in which said conductors lie, an indicating device, and means for connecting said indicating device to the anode circuit of detector tube.

5. A vacuum tube testing instrument for the detection of electro-magnetic fields adjacent to current carrying wires or other conductors, or objects which have become conductors as a result of proximity to said wires or conductors, comprising: a vacuum tube detector having grid, cathode and anode electrodes, an antenna consisting of a substantially straight member of predetermined dimensions connected to said grid, said antenna being adapted to be positioned in parallel inductive relation with the conductors to be located to determine the direction in which said conductors lie, an amplifier having one or more stages of amplification connected to the anode of said detector, indicating device means connected to the output of said amplifier to indicate the comparative strength and nature of fields being investigated and for detection of said electro-magnetic fields, a high impedance grid-leak connected to said detector between said grid and cathode electrodes, the impedance of said grid-leak being just low enough to prevent "blocking" of the grid of said detector under conditions where strong fields are being investigated.

6. A vacuum tube testing instrument for the detection of electro-magnetic fields adjacent to current carrying wires or other conductors or objects which have become conductors as a result of proximity to said wires or conductors, comprising: an extremely sensitive vacuum tube detector having a cathode, an anode and at least one grid electrode, a high impedance grid return circuit connected between said cathode and grid electrodes, an antenna consisting of a substantially straight conducting member connected direct to the grid electrode of said detector, said antenna being of predetermined dimensions such that wires, conductors or objects carrying current or receiving electrical charges as a result of close proximity to current conductors may be located by placing said antenna adjacent to and along side thereof, an amplifier connected to the anode of said detector, a high impedance circuit for connecting said amplifier to said detector, and indicating means connected to said amplifier.

7. A portable vacuum tube testing instrument for the detection of electro-magnetic fields adjacent to current carrying wires, or other conductors, or objects which have become conductors as a result of proximity to said wires or conductors, comprising: a vacuum tube detector having anode cathode and at least one grid electrode, said vacuum tube having a high impedance grid discharge path to said cathode, a rod-like antenna of predetermined length connected to the grid of said detector, an amplifier connected to said detector, indicating means connected to said amplifier, current supply sources for energizing the anode and cathode circuits of said detector and said amplifier, a cabinet for housing said detector, said amplifier and said current supply sources, and an insulation support attached to said cabinet for supporting said antenna in a predetermined position extending away from said cabinet in such a way that the antenna may be moved to or away from the conductors to be located with the minimum physical interference from said cabinet, said antenna and said insulation support having plug and jack means whereby said antenna may be removed from said support and disconnected from said detector when the instrument is not in use.

8. A portable vacuum tube testing instrument for the detection of electro-magnetic fields adjacent to current carrying wires or other conductors, or objects which have become conductors as a result of proximity to said wires or conductors, comprising: a sensitive detector tube having cathode, anode and grid electrodes, a high impedance grid leak included in the circuit between said cathode and grid electrodes, sources of current supply connected to energize said cathode and said anode, said grid leak impedance being of such a high value as to reduce the anode current substantially to a negligible value when the grid electrode of said detector tube is not being energized by signal energy, an antenna connected to said detector tube grid electrode, said antenna being portable and of small physical dimensions such that its long dimensions may be positioned in parallel relation to conductors to be located, an indicating device, means for connecting said indicating device to the anode circuit of detector tube, a cabinet for said detector and associated apparatus, means for attaching said antenna to said cabinet in such manner that the testing instrument may be moved from place to place and conveniently passed along or adjacent to conductors while in operative condition.

MERWYN BLY.